United States Patent
Maone et al.

(10) Patent No.: US 6,917,994 B2
(45) Date of Patent: Jul. 12, 2005

(54) DEVICE AND METHOD FOR AUTOMATICALLY GENERATING AN APPROPRIATE NUMBER OF WAIT CYCLES WHILE READING A NONVOLATILE MEMORY

(75) Inventors: Alessandro Francesco Maone, Palermo (IT); Maurizio Francesco Perroni, Furnari (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 435 days.

(21) Appl. No.: 10/115,888

(22) Filed: Apr. 3, 2002

(65) Prior Publication Data

US 2002/0184420 A1 Dec. 5, 2002

(30) Foreign Application Priority Data

Apr. 6, 2001 (IT) .................................... TO2001A0333

(51) Int. Cl.[7] ............................................. G06F 13/42
(52) U.S. Cl. ..................... 710/105; 710/104; 710/118; 710/309; 711/167
(58) Field of Search ............................... 710/104–107, 710/113–125, 311–315, 58–61, 240–244; 711/167–169; 365/185.21; 713/400, 500–502

(56) References Cited

U.S. PATENT DOCUMENTS

| 5,070,473 A | * | 12/1991 | Takano et al. ............... 710/260 |
| 5,155,812 A | * | 10/1992 | Ehlig et al. .................... 710/59 |
| 5,201,036 A | * | 4/1993 | Yoshimatsu .................. 710/107 |
| 5,313,621 A | * | 5/1994 | Chan ............................ 710/48 |
| 5,563,843 A | * | 10/1996 | Fackenthal et al. ....... 365/233.5 |
| 5,623,648 A | * | 4/1997 | Childs ......................... 713/502 |
| 5,684,752 A | * | 11/1997 | Mills et al. ............ 365/230.03 |
| 5,809,517 A | * | 9/1998 | Shimura ..................... 711/115 |
| 5,854,944 A | * | 12/1998 | Catherwood et al. ......... 710/59 |
| 6,119,189 A | * | 9/2000 | Gafken et al. .............. 710/110 |
| 6,131,127 A | * | 10/2000 | Gafken et al. ................. 710/1 |
| 6,356,987 B1 | * | 3/2002 | Aulas ........................ 711/167 |
| 6,742,058 B2 | * | 5/2004 | Jahnke et al. ................. 710/14 |

* cited by examiner

*Primary Examiner*—Paul R. Myers
*Assistant Examiner*—Raymond N Phan
(74) *Attorney, Agent, or Firm*—Lisa K. Jorgenson; David V. Carlson; Seed IP Law Group PLLC

(57) ABSTRACT

An interface manages the exchange of information between a bus system and a memory during reading, according to a communication protocol. The interface has a protocol-decoding unit, which receives from outside commands and information for managing the reading and generates a wait-code enabling signal, and a wait-state generating unit, which is connected to the protocol-decoding unit and outputs wait codes upon receipt of the wait-code enabling signal. When the memory ends reading, as signaled by switching of a read-state signal, a wait-state disabling circuit generates and supplies an end-of-waiting control signal to the wait-state generating unit, which thus outputs an end-of-waiting code.

33 Claims, 2 Drawing Sheets

DEVICE AND METHOD FOR AUTOMATICALLY GENERATING AN APPROPRIATE NUMBER OF WAIT CYCLES WHILE READING A NONVOLATILE MEMORY

BACKGROUND OF THE INVENTION

1. Field of the Invention

The present invention relates to a device and method for managing wait cycles while reading a nonvolatile memory, in particular a flash memory integrated with a low pin count (LPC) interface for PCBios applications and using one of the serial communication protocols forming part of the family protocols of the LPC type.

2. Description of the Related Art

As is known, when reading or writing is to be performed in a memory that uses a communication protocol, an external device or "host," sends, on the system bus connecting the memory itself to the host device, in a timely sequential way and according to a pre-determined sequence of cycles, codes and information forming, as a whole, the communication protocol itself. The codes, regarding commands to be executed, and the information, regarding the addresses, are decoded in one clock cycle.

The pattern of the cycles provided in a generic communication protocol of the LPC type may be divided into two fundamental parts: one first step when the external host controls the bus, and a second step when the bus control is handed over to the memory.

During the first step, the host supplies the codes for a read/write operation in a memory array, as well as the addresses of the byte to be read/written.

Next, two turn-around (TAR) cycles, TAR_1 and TAR_2, are provided, the second of which corresponds to a high-impedance condition.

In particular, by way of example, FIG. 1 shows the set of the clock cycles with the corresponding codes, for the I/O Cycles communication protocol.

The protocol of FIG. 1 (starting from instant t0) comprises a START cycle, which enables all the rest of the protocol, a CYCT+DIR cycle, during which it is specified whether a memory-array reading or writing operation is to be performed, eight address cycles (ADDR) and the two TAR cycles (TAR_1 and TAR_2). During the latter two cycles, the host hands over control of the bus system to the memory.

Subsequently, during the second step, it is the memory itself that controls the bus system and generates a series of SYNC or wait cycles, the last of which, designated as SYNC_E, is a ready signal and has a value different from the previous ones, to signal when the data are ready to be supplied outside; then the memory sends out the data read, divided between the first four bits (DL cycle) and the second four bits (DH cycle), thus terminating the protocol.

The SYNC cycles (including the last one, SYNC_E) define wait states during which the memory must perform all the operations necessary for reading the word addressed and set the requesting host device in a listening state until the results arrive. Normal SYNC cycles (except for the last one, SYNC_E) generally have two different values according to whether a long wait or a short wait is envisaged. According to the type of serial communication protocol used, the number of short wait cycles (SYNC) can have a maximum admissible value, which cannot be exceeded.

With the protocol described, the total maximum number of short wait cycles (including the last one, SYNC_E) is eight; if the memory outputs a number of short cycles exceeding eight, the host device aborts the reading cycle.

At present, the overall number of wait cycles SYNC is fixed beforehand (i.e., via hardware), taking into account the size of the memory used (currently, from 2 to 32 Mb), the supply voltage (currently, 1.8 V, 3.3 V or 5 V, which determines different access times), the reading type (for example, in burst mode the time taken by the memory for performing the first reading and the time taken to perform the subsequent readings are very different, resulting in different wait times in the two cases), the technology of memory (which determines performance thereof), and the speed of the clock (currently 33 or 66 MHz).

For example, with a memory core having an access time of less than 90 ns and a 33-MHz clock, three wait cycles are generally sufficient to synchronize internal reading with the step of supplying the data read outwards.

This is disadvantageous, in so far as it requires an evaluation, often also on silicon, of the response times of the memory, as well as modification, via hardware, of the communication protocol, to adapt it to the existing conditions.

BRIEF SUMMARY OF THE INVENTION

Aspects of the present invention provide a method for automatic management of the wait cycles. Further aspects provide a standard interface independent of the access time of the used nonvolatile memory and operating at different clock frequencies.

Additional aspects of the present invention provide an interface for managing information exchange between a system bus and a memory during reading, according to a communication protocol.

In practice, the interface can be integrated in or connected to nonvolatile memories having different characteristics. This is obtained by synchronizing the end of the wait cycles SYNC with the end of all the internal reading operations of the memory. In this way, whenever the memory has the data ready at output, a final wait cycle is generated, which signals the end of the wait states. A standard architecture is therefore created that is able to carry out the entire protocol, generating from one wait cycle to a maximum number (possibly defined by the particular protocol used) of wait cycles, according to the characteristics of the memory considered.

Further aspects include an interface for managing exchange of information between a bus system and a memory during reading, according to a communication protocol, the interface. Further aspects include input/output terminals configured to be connected to said system bus. Further aspects include a protocol-decoding unit configured to receive from said input/output terminals commands and information for managing reading and configured to generate a wait-code enabling signal. Further aspects include a wait-state generating unit connected to said protocol-decoding unit and configured to supply wait codes to said first input/output terminals upon reception of said wait-code enabling signal and a wait-state disabling circuit configured to generate an end-of-waiting control signal to be supplied to said wait-state generator upon reception of a read-state signal from said memory, said wait-state generating unit configured to supply an end-of-waiting code to said input/output terminals upon reception of said end-of-waiting signal.

Other features and advantages of the invention will become apparent from the following detailed description, taken in conjunction with the accompanying drawings.

BRIEF DESCRIPTION OF THE SEVERAL VIEWS OF THE DRAWING(S)

For a better understanding of the present invention, a preferred embodiment thereof is now described, purely by way of non-limiting example, with reference to the attached drawings, wherein.

DETAILED DESCRIPTION OF THE INVENTION

Figure 2:
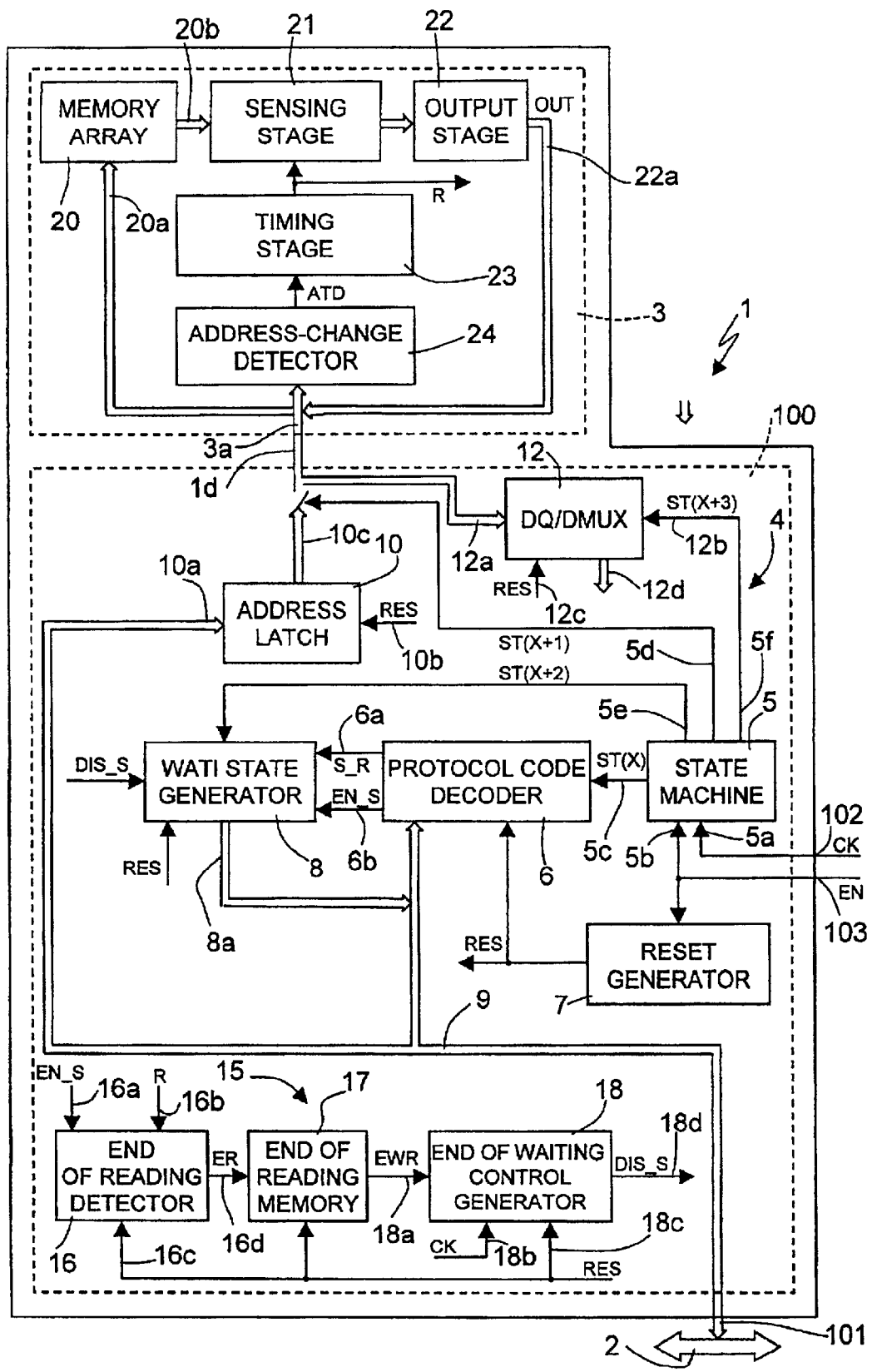
FIG. 2 is a simplified block diagram of a memory device incorporating an interface according to an embodiment of the invention.

As illustrated in FIG. 2, an interface 100 is incorporated in a memory device 1 and is set between a portion of memory proper, or "core"—hereinafter designated as memory 3—and a system bus 2.

The interface 100 has four input/output pins, designated as a whole by 101 and connected to the system bus 2, transferring the signals of the communication protocol, and two inputs 102, 103, which receive from outside respectively a clock signal CK and an enabling signal EN.

The interface 100 comprises a standard part 4, for managing the communication-protocol signals, the exchanged addresses and the data, and a wait-length control part 15, which will be described later. The standard part 4 comprises a state machine 5, a protocol-code decoder 6, a reset generator 7, a wait-state generator 8, an address-latch block 10, and a data-latch block 12, all of which are built in a known way and are not described in detail. The wait-length control part 15 comprises a end-of-reading detector 16, an end-of-reading memory 17, and an end-of-waiting request generator 18.

In detail, the state machine 5 has a first input 5a connected to the input 102 of the interface 100, a second input 5b connected to the input 103 of the interface 100, a first output 5c supplying a first state signal ST(X), a second output 5d supplying a second state signal ST(X+1), a third output 5e supplying a third state signal ST(X+2), and a fourth output 5f supplying a fourth state signal ST(X+3).

The first state signal ST(X) is supplied to the protocol-code decoder 6, which also receives a reset signal RES generated by the reset generator 7 and the communication-protocol signals, via a first internal bus 9 connected to the input/output pins 101. The protocol-code decoder 6 has a first output 6a supplying a start-of-reading signal S_R and a second output 6b supplying a wait-enable signal EN_S, both supplied to the wait-state generator 8.

The wait-state generator 8 moreover receives the third state signal ST(X+2), the reset signal RES, and a wait-disable signal DIS_S; the wait-state generator 8 moreover has outputs 8a connected to the first internal bus 9 to supply the wait cycles SYNC, as described in greater detail in what follows.

The address-latch block 10 has inputs 10a connected to the first internal bus 9, from which it receives, among other things, the addresses of the locations to be read in the cycles ADDR, an input 10b on which it receives the reset signal RES, and outputs 10c on which the addresses themselves are supplied. A switch 11 is set between the outputs 10c of the address-latch block 10 and a second internal bus 13 of the memory device 1, and is controlled via the second state signal ST(X+1).

The data-latch block 12 has first inputs 12a connected to the second internal bus 13, a second input 12b receiving the fourth state signal ST(X+3), a third input 12c receiving the reset signal RES, and outputs 12d connected to the input/output pins 101.

The end-of-reading detector 16, formed, for example, by a logic circuit (including a NOR gate with a delayed and negated input) not shown in detail, has a first input 16a receiving the wait-enable signal EN_S, a second input 16b receiving the read signal R generated by the memory 3, a third input 16c receiving the reset signal RES, and an output 16d supplying an end-of-reading signal ER to the end-of-reading memory 17.

The end-of-reading memory 17, for example formed by a latch SR, has a setting input receiving the end-of-reading signal ER, a reset input receiving the reset signal RES, and an output supplying the end-of-waiting request signal EWR.

The end-of-waiting request generator 18, formed for example by a master/slave flip-flop, has a signal input 18a receiving the end-of-waiting request signal EWR, a timing input 18b receiving the clock signal CK, a reset input 18c receiving the reset signal RES, and an output 18d supplying the wait-disable signal DIS_S to the wait-state generator 8.

The memory 3, for example of the flash type, comprises essentially a memory array 20, a sensing state 21, an output stage 22, a timing stage 23, and an address-transition sensing stage 24.

In detail, the memory array 20 has inputs connected to the second internal bus 13 and receiving the addresses of the bits to be read, and outputs 20b connected to the sensing stage 21. The sensing stage 21 comprises a plurality of sense amplifiers (not shown), which, when enabled by the read signal R, supply the data read to the output stage 22. The output stage 22 then supplies the data OUT on the second internal bus 13.

The address-transition sensing stage 24 is connected to the second internal bus 13 and, upon detection of the address data ADDR, generates an address-transition signal ATD supplied to the timing stage 23, which in turn generates the read signal R in a known way.

Figures 1, 3:
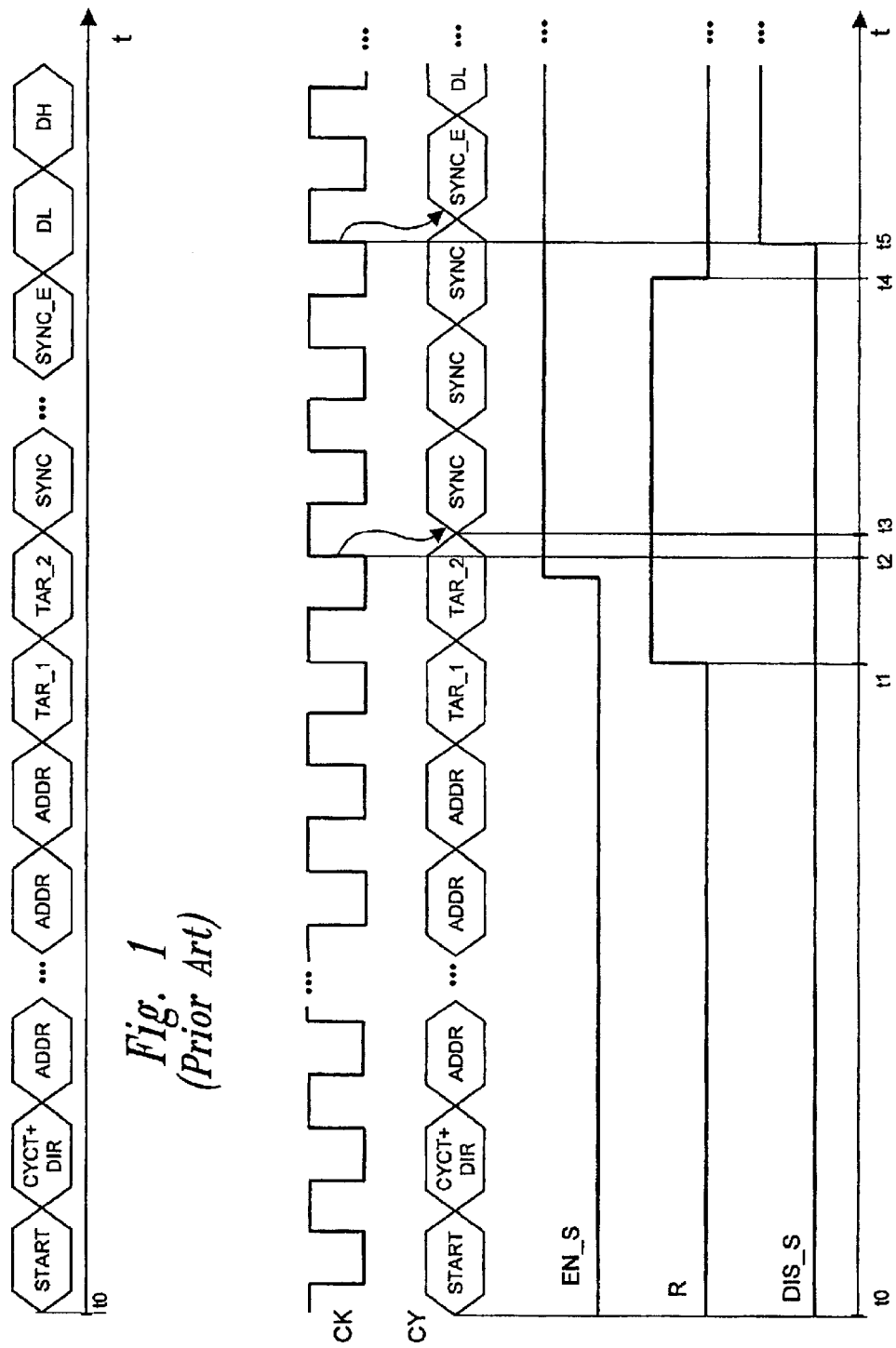
FIG. 1 illustrates a timing diagram for a known communication protocol used by an embodiment of the present invention.
FIG. 3 is a timing diagram for control signals correlated to the communication protocol used according to an embodiment of the present invention.

The interface 100 operates as is described hereinafter (see also the timing diagram of FIG. 3).

Upon receiving the enabling signal EN, the reset generator 7 resets the various blocks connected to it through the reset signal RES and turns on the state machine 5, which starts receiving the clock signal CK.

As soon as the x-th state is reached, the state machine 5 generates the first state signal ST(X), which activates decoding of the signals of the communication protocol supplied by the system bus 2 on the input/output pins 101.

When the protocol-code decoder 6 recognizes, in the cycle CYCT+DIR (in the I/O Cycles protocol described previously by way of example) a read command, it causes the start-of-reading signal S_R to switch to the high state which is stored inside the wait-state generator 8.

Next, as soon as the communication protocol supplies on the system bus 2 the addresses of the data to be read in the cycles ADDR, four bits at a time, the addresses are stored in the address-latch block 10. Then, in the (x+1)-th state, the state machine 5 closes the switch via the second state signal ST(X+1), and the addresses are supplied to the address-change detector 24 (which generates the address-transition signal ATD, of a pulsed type) and to the memory array 20.

Upon receiving the pulsed signal ATD, the timing stage 23 causes the read signal R to switch to the high state, thus enabling the sensing stage 21 for reading (instant t1).

Upon recognizing the cycle TAR_2, the protocol-code decoder 6 causes the wait-enable signal EN_S to switch; in addition, at the immediately subsequent positive switching edge (corresponding to the (x+2)-th state—instant t2), the state machine 5 enables generation of the wait cycles, supplying the third state signal ST(X+2) to the wait-state generator 8 (instant t3). The latter then starts supplying the SYNC cycles towards the input/output pins 101.

The wait-enable signal EN_S is moreover supplied to the end-of-reading detector 16, which thus sets itself in a condition of observation of the read signal R.

As soon as the end-of-reading detector 16 detects the negative edge of the read signal R (instant t4), it generates the end-of-reading signal ER (of a pulsed type), which is stored in the end-of-reading memory 17, and causes switching of the end-of-waiting-request signal EWR to a pre-set logic state. Next, as soon as the end-of-waiting control generator 18 detects a rising edge of the clock signal CK, it causes switching of the wait-disable signal DIS_S (instant t5) supplied to the wait-state generator 8, which then generates the last wait cycle SYNC_E which determines end of reading. In practice, on the rising edge of the clock signal CK following upon the falling edge of the read signal R, the wait-disable signal DIS_S is generated, and then the last wait cycle SYNC_E is sent.

Finally, in a per se known manner, the state machine 5, via the fourth state signal ST(X+3) controls transfer of the output data OUT (in two successive cycles DL and DH) to the input/output pins 101.

The interface described presents the following advantages.

First, it makes it possible to automatically adapt the protocol to memories, in particular of the flash type, of different sizes, enabling generation of the SYNC cycles from a minimum of one cycle to a maximum established by the specifications of the protocol used. In this way, the interface may be immediately applied to all the devices currently produced, without requiring any operations of adaptation or adjustment. In addition, this architecture enables matching of the interface even in the event of possible process drifts being present, without creating any malfunctioning within the application.

Finally, it is clear that modifications and variations may be made to the interface and method described herein, without thereby departing from the scope of the present invention. In particular, the method described may be applied also to an interface not integrated with the memory 3, provided that it implements a reading protocol having wait cycles of the type described.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An interface for managing exchange of information between a bus system and a memory during reading, according to a communication protocol, the interface comprising:
   input/output terminals configured to be connected to said system bus;
   a protocol-decoding unit configured to receive from said input/output terminals commands and information for managing reading and configured to generate a wait-code enabling signal;
   a wait-state generating unit connected to said protocol-decoding unit and configured to supply wait codes to said first input/output terminals upon reception of said wait-code enabling signal; and
   a wait-state disabling circuit configured to generate an end-of-waiting control signal to be supplied to said wait-state generator upon reception of a read-state signal from said memory, said wait-state generating unit configured to supply an end-of-waiting code to said input/output terminals upon reception of said end-of-waiting control signal.

2. The interface according to claim 1 wherein said wait-state disabling circuit includes:
   an end-of-reading sensing stage configured to receive said read-state signal and configured to generate an end-of-waiting request signal upon detection of a pre-set switching edge of said read-state signal; and
   an end-of-waiting forcing stage configured to receive said end-of-waiting request signal and a synchronization signal and configured to supply said end-of-waiting control signal in presence of a pre-set state of said end-of-waiting request signal and upon reception of a pre-set switching edge of said synchronization signal.

3. The interface according to any of claims 1, further comprising a control unit configured to receive an enabling signal and a synchronization signal, said control unit configured to generate, upon reception of said enabling signal and synchronously with said synchronization signal, a first enabling signal and a second enabling signal respectively supplied to said protocol-decoding unit and to said wait-state generating unit.

4. The interface according to any of claim 1 further comprising integration means configured to integrate said interface in a memory device with said memory.

5. The interface according to claim 1 wherein the wait-state generating unit and the wait-state disabling circuit are distinct functional units.

6. The interface according to claim 2 wherein said end-of-reading sensing stage includes:
   an end-of-reading detector configured to receive said read-state signal and said wait-code enabling signal and configured to generate an end-of-reading signal in the presence of a pre-set state of said wait-code enabling signal and upon detection of said pre-set switching edge of said read-state signal; and
   an end-of-reading memory configured to receive said end-of-reading signal and to generate said end-of-waiting signal.

7. The interface according to claim 3 wherein said control unit is a state machine configured to generate state signals including, in sequence:
   said first enabling signal;
   a third enabling signal supplied to a switch unit for transmission of address signals from said input/output terminals to said memory;
   said second enabling signal; and
   a fourth enabling signal for enabling data transmission from said memory to said input/output terminals.

8. The interface according to claim 6 wherein said end-of-reading memory is a latch of an SR type, and said end-of-waiting forcing stage is a master/slave flip-flop.

9. A method for managing exchange of information between a system bus and a memory during a reading step, according to a communication protocol, the method comprising:

receiving commands and information for management of the reading step;

decoding said commands;

generating a wait-code enabling signal upon reception of a reading code;

generating wait codes upon reception of said wait-code enabling signal;

receiving a read-state signal;

generating an end-of-waiting control signal as a result of reception of a pre-set switching edge of said read-state signal; and generating an end-of-waiting code upon reception of said end-of-waiting control signal.

10. The method according to claim 9 wherein said generating an end-of-waiting control signal includes:

generating an end-of-waiting request signal upon detection of said pre-set switching edge of said read-state signal;

receiving a synchronization signal; and generating said end-of-waiting control signal in presence of a pre-set state of said end-of-waiting request signal and upon reception of a pre-set switching edge of said synchronization signal.

11. A system for managing exchange of information between a system bus and a memory, the system comprising:

means for receiving commands and information for management of the reading step;

means for decoding said commands;

means for generating a wait-code enabling signal upon reception of a reading code;

means for generating wait codes upon reception of said wait-code enabling signal;

means for receiving a read-state signal;

means for generating an end-of-waiting control signal after reception of a pre-set switching edge of said read-state signal; and means for generating an end-of-waiting code upon reception of said end-of-waiting control signal.

12. The system according to claim 11 wherein said means for generating an end-of-waiting control signal includes:

means for generating an end-of-waiting request signal upon detection of said pre-set switching edge of said read-state signal;

means for receiving a synchronization signal; and means for generating said end-of-waiting control signal in presence of a pre-set state of said end-of-waiting request signal and upon reception of a pre-set switching edge of said synchronization signal.

13. For operation with a system bus, a memory device comprising:

a memory;

an interface configured to manage exchange of information between the system bus and the memory during reading, according to a communication protocol, the interface including:

input/output terminals configured to be connected to said system bus;

a protocol-decoding unit configured to receive from said input/output terminals commands and information for managing reading and configured to generate a wait-code enabling signal;

a wait-state generating unit connected to said protocol-decoding unit and configured to supply wait codes to said first input/output terminals upon reception of said wait-code enabling signal; and a wait-state disabling circuit configured to generate an end-of-waiting control signal to be supplied to said wait-state generator upon reception of a read-state signal from said memory, said wait-state generating unit configured to supply an end-of-waiting code to said input/output terminals upon reception of said end-of-waiting control signal.

14. The interface according to claim 13 wherein said wait-state disabling circuit includes:

an end-of-reading sensing stage configured to receive said read-state signal and configured to generate an end-of-waiting request signal upon detection of a pre-set switching edge of said read-state signal; and an end-of-waiting forcing stage configured to receive said end-of-waiting request signal and a synchronization signal and configured to supply said end-of-waiting control signal in presence of a pre-set state of said end-of-waiting request signal and upon reception of a pre-set switching edge of said synchronization signal.

15. The interface according to claim 13, further comprising a control unit configured to receive an enabling signal and a synchronization signal, said control unit configured to generate, upon reception of said enabling signal and synchronously with said synchronization signal, a first enabling signal and a second enabling signal respectively supplied to said protocol-decoding unit and to said wait-state generating unit.

16. The interface according to claim 13 further comprising integration means configured to integrate said interface in a memory device with said memory.

17. The interface according to claim 14 wherein said end-of-reading sensing stage includes:

an end-of-reading detector configured to receive said read-state signal and said wait-code enabling signal and configured to generate an end-of-reading signal in the presence of a pre-set state of said wait-code enabling signal and upon detection of said pre-set switching edge of said read-state signal; and an end-of-reading memory configured to receive said end-of-reading signal and to generate said end-of-waiting signal.

18. The interface according to claim 17 wherein said end-of-reading memory is a latch of an SR type, and said end-of-waiting forcing stage is a master/slave flip-flop.

19. The interface according to claim 15 wherein said control unit is a state machine configured to generate state signals including, in sequence:

said first enabling signal;

a third enabling signal supplied to a switch unit for transmission of address signals from said input/output terminals to said memory;

said second enabling signal; and a fourth enabling signal for enabling data transmission from said memory to said input/output terminals.

20. A computer system comprising:

a system bus;

a processor communicatively linked to the system bus;

a memory;

an interface communicatively linked to the system bus and to the memory, the interface configured to manage exchange of information between the system bus and the memory during reading, according to a communication protocol, the interface including:

input/output terminals configured to be connected to said system bus;

a protocol-decoding unit configured to receive from said input/output terminals commands and information for managing reading and configured to generate a wait-code enabling signal;

a wait-state generating unit connected to said protocol-decoding unit and configured to supply wait codes to said first input/output terminals upon reception of said wait-code enabling signal; and a wait-state disabling circuit configured to generate an end-of-waiting control signal to be supplied to said wait-state generator upon reception of a read-state signal from said memory, said wait-state generating unit configured to supply an end-of-waiting code to said input/output terminals upon reception of said end-of-waiting control signal.

21. The interface according to claim 20 wherein said wait-state disabling circuit includes:

an end-of-reading sensing stage configured to receive said read-state signal and configured to generate an end-of-waiting request signal upon detection of a pre-set switching edge of said read-state signal; and an end-of-waiting forcing stage configured to receive said end-of-waiting request signal and a synchronization signal and configured to supply said end-of-waiting control signal in presence of a pre-set state of said end-of-waiting request signal and upon reception of a pre-set switching edge of said synchronization signal.

22. The interface according to any of claims 20, further comprising a control unit configured to receive an enabling signal and a synchronization signal, said control unit configured to generate, upon reception of said enabling signal and synchronously with said synchronization signal, a first enabling signal and a second enabling signal respectively supplied to said protocol-decoding unit and to said wait-state generating unit.

23. The interface according to claim 20 further comprising integration means configured to integrate said interface in a memory device with said memory.

24. The interface according to claim 21 wherein said end-of-reading sensing stage includes:

an end-of-reading detector configured to receive said read-state signal and said wait-code enabling signal and configured to generate an end-of-reading signal in the presence of a pre-set state of said wait-code enabling signal and upon detection of said pre-set switching edge of said read-state signal; and an end-of-reading memory configured to receive said end-of-reading signal and to generate said end-of-waiting control signal.

25. The interface according to claim 24 wherein said end-of-reading memory is a latch of an SR type, and said end-of-waiting forcing stage is a master/slave flip-flop.

26. The interface according to claim 22 wherein said control unit is a state machine configured to generate state signals including, in sequence:

said first enabling signal;

a third enabling signal supplied to a switch unit for transmission of address signals from said input/output terminals to said memory;

said second enabling signal; and a fourth enabling signal for enabling data transmission from said memory to said input/output terminals.

27. An interface for managing exchange of information between a bus system and a memory during reading, according to a communication protocol, the interface comprising:

input/output terminals configured to be connected to said system bus;

a protocol-decoding module configured to receive from said input/output terminals commands and information for managing reading and configured to generate a wait-code enabling signal;

a wait-state generating module connected to said protocol-decoding module and configured to supply wait codes to said first input/output terminals upon reception of said wait-code enabling signal; and a wait-state disabling module configured to generate an end-of-waiting control signal to be supplied to said wait-state generator upon reception of a read-state signal from said memory, said wait-state generating module configured to supply an end-of-waiting code to said input/output terminals upon reception of said end-of-waiting control signal.

28. The interface according to claim 27 wherein said wait-state disabling module includes:

an end-of-reading sensing stage configured to receive said read-state signal and configured to generate an end-of-waiting request signal upon detection of a pre-set switching edge of said read-state signal; and an end-of-waiting forcing stage configured to receive said end-of-waiting request signal and a synchronization signal and configured to supply said end-of-waiting control signal in presence of a pre-set state of said end-of-waiting request signal and upon reception of a pre-set switching edge of said synchronization signal.

29. The interface according to claims 27, further comprising a control module configured to receive an enabling signal and a synchronization signal, said control module configured to generate, upon reception of said enabling signal and synchronously with said synchronization signal, a first enabling signal and a second enabling signal respectively supplied to said protocol-decoding module and to said wait-state generating module.

30. The interface according to claim 27 further comprising integration means configured to integrate said interface in a memory device with said memory.

31. The interface according to claim 28 wherein said end-of-reading sensing stage includes:

an end-of-reading detector configured to receive said read-state signal and said wait-code enabling signal and configured to generate an end-of-reading signal in the presence of a pre-set state of said wait-code enabling signal and upon detection of said pre-set switching edge of said read-state signal; and an end-of-reading memory configured to receive said end-of-reading signal and to generate said end-of-waiting control signal.

32. The interface according to claim 29 wherein said control module is a state machine configured to generate state signals including, in sequence:

said first enabling signal;

a third enabling signal supplied to a switch module for transmission of address signals from said input/output terminals to said memory;

said second enabling signal; and a fourth enabling signal for enabling data transmission from said memory to said input/output terminals.

33. The interface according to claim 31 wherein said end-of-reading memory is a latch of an SR type, and said end-of-waiting forcing stage is a master/slave flip-flop.

* * * * *